J. J. LUCAS.
REVOLVING SULKY-RAKE.
No. 176,327.  Patented April 18, 1876.
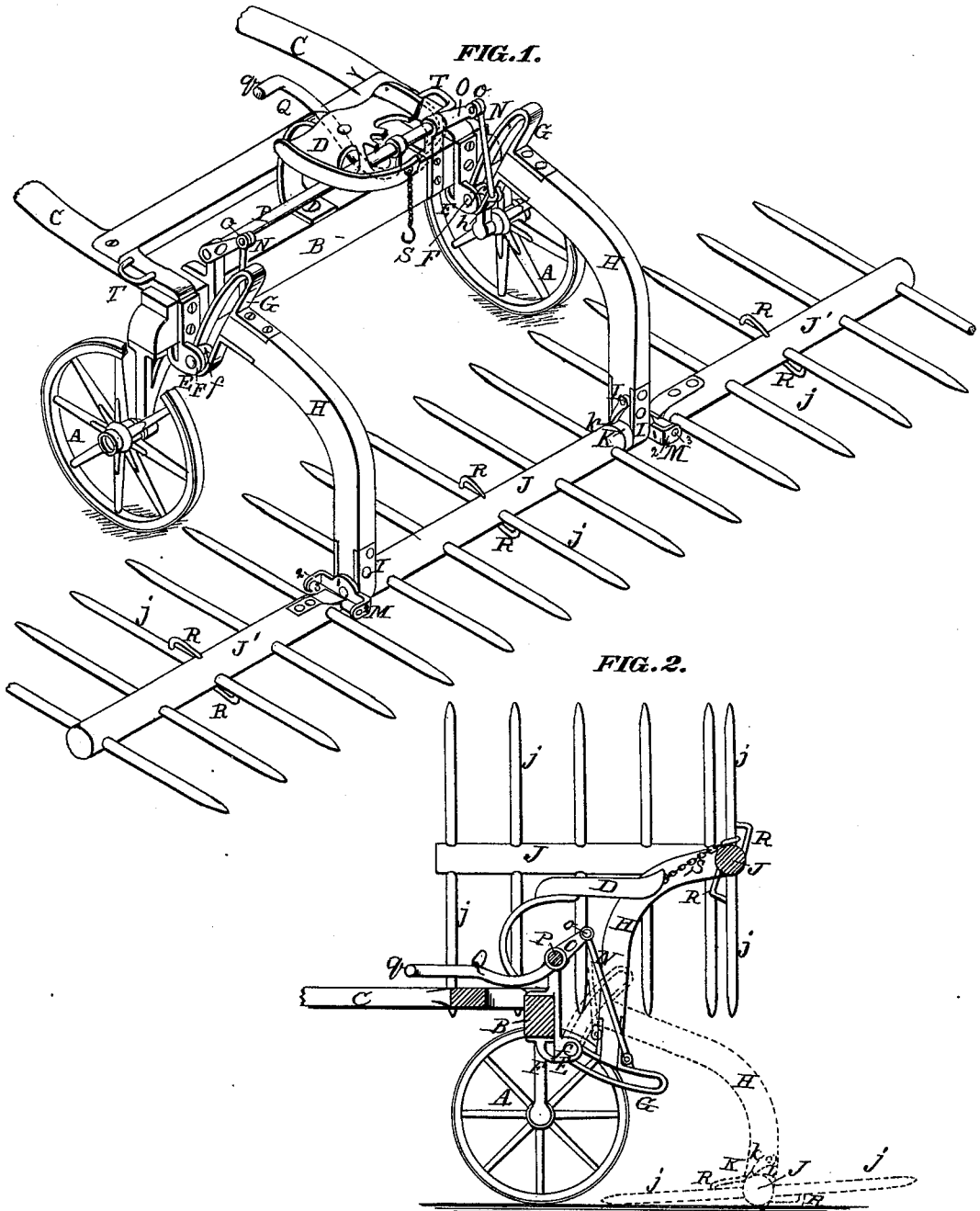
ATTEST:
Robt Burns
H. Hutchins
INVENTOR:
John J. Lucas
By Knight Bros.
Attys.

UNITED STATES PATENT OFFICE.

JOHN J. LUCAS, OF BELLEVILLE, ILLINOIS, ASSIGNOR OF ONE-HALF HIS RIGHT TO ENOCH W. PRIMM, OF SAME PLACE.

IMPROVEMENT IN REVOLVING SULKY-RAKES.

Specification forming part of Letters Patent No. 176,327, dated April 18, 1876; application filed December 23, 1875.

*To all whom it may concern:*

Be it known that I, JOHN J. LUCAS, of Belleville, in the county of St. Clair and State of Illinois, have invented a new and useful Improvement in Revolving Sulky-Rakes, which improvement is fully set forth in the following specification, reference being had to the accompanying drawings.

The first part of my improvement consists in combining, with a jointed rake, simple devices for retaining the rake in its elevated position.

The second part of my improvement consists in the combination, with said rake, of the beams by which it is connected to the sulky axle-bar, the fore ends of these beams having clevises allowing of considerable vertical movement of the fore ends of the beams necessary to the tilting of the rake for the discharge of the gathered hay.

In the drawings, Figure 1 is a perspective view. Fig. 2 is a longitudinal section.

A A are the sulky-wheels. B is the raised axle-bar, and C C the thills or shafts. D is the seat. E E are brackets at the rear side of the axle-bar B, carrying clevis-pins F and anti-friction rollers $f$, which work in the vertically elongated and curved clevises G G at the front ends of the curved beams H H. At the lower and rear ends of each of the beams are straps I surrounding a circular portion of the rake-bar J, so that the rake-bar may turn in said strap-joints. The bar J has ratchet-collars K K, each having two ratchet-teeth, $k$ $k$, which act in conjunction with the pawls L to partially rotate the bar J, when the front ends of the beams are lowered to tilt the rake and discharge its load.

At the ends of the bar J are hinges M M, connecting it to end bars J' J', the hinges being arranged so as to hold the ends J' J' rigidly in line against a horizontal strain when the rake is in operation, and to allow the ends to be folded inward in a direction at right angles thereto. These hinges M M are constructed as follows: 1 1 are plates riveted at their centers to each end of the rake-bar J and provided with ears 2 2. The ears form bearings for the pintles 3 3, which are rigidly secured to the extension-bars J' J'.

The purpose of these hinges is twofold: first, to allow the rake to conform to the irregularities of the ground; and, secondly, to allow its ends to be folded in when it is raised, as shown in Fig. 2, for removal from one field to another. These bars J J' have the usual teeth $j$.

I will now describe the appliances for tilting the rake to cause its semi-rotation for the discharge of the accumulated hay.

Each beam H has at the front end a side pin, $h$, on which engages a link, N, whose upper end is connected by a pin, $o$, to an arm, O, of the rock-shaft P. From the rock-shaft extends a treadle-arm, Q, with a foot-rest, $q$. As long as the foot-arm Q is held down by the foot, the rake continues to accumulate hay; but when the foot is raised the fore ends of the beams H H descend, and by means of the pawls L L and the ratchets $k$ $k$ the rear rake-teeth are lifted up and the points of the front teeth engage against the ground, and the rake makes a semi-rotation and deposits the accumulated hay.

R R are runners, which are formed of metal, and which tend to hold the rake in the proper position on the ground when in operation.

When moving the rake from one field to another it is put in the position shown in Fig. 2, the fore ends of the beams being lowered so that the rollers $f$ occupy the upper ends of the clevises, and the rear ends of the beams are raised so that the teeth of the rake are elevated from the ground; and the parts are held in this position by the chain S, whose other end is attached to the back of the seat. The ends J' J' are folded in and a tooth of each of such ends rests in a staple, T, to hold them in this position.

I claim as my invention—

1. The combination, with the jointed rake J J' J' $j$ and sulky, of the staples T and chain S, for securing the rake in elevated position, in the manner set forth.

2. The combination, with the rake J and axle-bar B, of the beams H H, provided with vertically-elongated clevises G, allowing the vertical movement of the fore ends of the beams, substantially as and for the purpose set forth.

3. The combination of beams H with elongated clevises G, links N, arms O, rock-shaft P, and treadle-arm Q, substantially as and for the purpose set forth.

4. The combination of axle B, having brackets E provided with clevis-pins F, beams H, having clevises G and jointed rake J J' J' j, all arranged as and for the purposes set forth.

JOHN J. LUCAS.

Witnesses:
 U. H. SIKKENA,
 PAUL GEIL.